United States Patent
Toth

(10) Patent No.: US 7,458,558 B1
(45) Date of Patent: Dec. 2, 2008

(54) CONTROLLED METHOD AND APPARATUS FOR RELEASING PRESSURE

(76) Inventor: Patricia Toth, 232 Harris Dr., Sewell, NJ (US) 08080

(\*) Notice: Subject to any disclaimer, the term of this patent is extended or adjusted under 35 U.S.C. 154(b) by 201 days.

(21) Appl. No.: 11/337,867

(22) Filed: Jan. 23, 2006

(51) Int. Cl.
*F16K 31/44* (2006.01)

(52) U.S. Cl. .................. 251/145; 251/216; 251/332; 251/900

(58) Field of Classification Search .............. 251/216, 251/215, 144, 145, 332, 900; 184/1.5, 88.1
See application file for complete search history.

(56) References Cited

U.S. PATENT DOCUMENTS

| | | | | |
|---|---|---|---|---|
| RE8,772 | E | * | 6/1879 | Shaw ................. 251/216 |
| 460,075 | A | * | 9/1891 | Schmedling ........... 251/216 |
| 869,878 | A | * | 11/1907 | Bruckner ............. 251/216 |
| 987,447 | A | * | 3/1911 | Dwyer ............... 251/216 |
| 1,548,091 | A | * | 8/1925 | Lombardi ............ 251/216 |
| 2,311,009 | A | * | 2/1943 | Urquhart ............. 251/332 |
| 2,371,293 | A | * | 3/1945 | Hoof ................. 137/67 |
| 2,417,494 | A | * | 3/1947 | Hoof et al. ........... 251/332 |
| 2,912,000 | A | * | 11/1959 | Green ................ 251/332 |
| 2,964,288 | A | * | 12/1960 | Holmes et al. ........ 251/126 |
| 3,094,137 | A | * | 6/1963 | Burke ............... 251/216 |
| 3,237,638 | A | * | 3/1966 | Rothenberg ......... 251/216 |
| 3,552,421 | A | * | 1/1971 | Yocum .............. 251/216 |
| 4,121,619 | A | * | 10/1978 | Pauliukonis .......... 137/469 |
| 4,165,904 | A | | 8/1979 | Reppert |
| 4,418,888 | A | * | 12/1983 | Jacobson et al. ....... 251/216 |
| 4,681,495 | A | | 7/1987 | Crespin et al. |
| 4,728,077 | A | * | 3/1988 | Takahashi ........... 251/900 |
| 4,826,373 | A | | 5/1989 | Nakano |
| 4,976,460 | A | * | 12/1990 | Newcombe et al. ..... 251/332 |
| 5,123,436 | A | * | 6/1992 | Koechlein et al. ...... 251/332 |
| 5,181,977 | A | | 1/1993 | Gneiding et al. |
| 5,499,648 | A | * | 3/1996 | Powell et al. ......... 251/332 |
| 5,832,951 | A | | 11/1998 | Conroy, Sr. |
| 5,928,468 | A | | 7/1999 | Tolson |
| 5,931,621 | A | | 8/1999 | Griffith et al. |
| 5,941,266 | A | * | 8/1999 | Henwood ............ 251/316 |
| 6,311,726 | B1 | * | 11/2001 | Chambliss ........... 251/264 |
| 6,588,999 | B2 | | 7/2003 | Kubler |
| 6,604,899 | B2 | | 8/2003 | Kubler |

FOREIGN PATENT DOCUMENTS

| | | |
|---|---|---|
| FR | 2.670.183 | 6/1992 |
| GB | 555.374 | 8/1943 |
| GB | 1.385.465 | 2/1975 |

\* cited by examiner

*Primary Examiner*—John Bastianelli
(74) *Attorney, Agent, or Firm*—Michael I Kroll

(57) ABSTRACT

Method and apparatus 10 for releasing pressure that may have built up behind a plug 18 in a controlled manner. Environmental and safety regulations mandate that all bleeder valves in a gas and liquid hydrocarbon and chemical service require metal plugs 18 to be installed downstream of the valve to ensure a positive shut off. Removal of these plugs 18 can create a hazardous condition if there is not a good seat on the bleeder valve. Pressure can build up behind the plug 18 and as the bull plug is removed, an uncontrolled pressure release can occur. The apparatus 10 is a safety device, serving as a plug 18 and also providing a method for releasing the pressure that may have built up behind the plug in a controlled manner. The device 10 comprises a carbon steel plug 18 fabricated with a vent hole 20 for controlled pressure release and a carbon steel modified hex bolt 22 having a tapered seat 26.

3 Claims, 7 Drawing Sheets

CONTROLLED METHOD AND APPARATUS FOR RELEASING PRESSURE

BACKGROUND OF THE INVENTION

1. Field of the Invention

The present invention relates generally to release valves and, more specifically, to a method and apparatus for releasing pressure that may have built up behind a plug in a controlled manner. Environmental and safety regulations mandate that all bleeder valves in a gas and liquid hydrocarbon and chemical service require metal plugs to be installed downstream of the valve to ensure a positive shut off. Removal of these plugs can create a hazardous condition if there is not a good seat on the bleeder valve. Pressure can build up behind the plug and as the bull plug is removed, an uncontrolled pressure release can occur. The present invention is a safety device, serving as a plug and also providing a method for releasing the pressure that may have built up behind the plug in a controlled manner. The device comprising a carbon steel plug fabricated with a vent hole for controlled pressure release and a carbon steel modified hex bolt having a tapered seat.

2. Description of the Prior Art

There are other valves designed for the same purpose. Typical of these is U.S. Pat. No. 4,165,904 issued to Reppert on Aug. 28, 1979.

Another patent was issued to Crespin et al. on Jul. 21, 1987 as U.S. Pat. No. 4,681,495. Yet another U.S. Pat. No. 4,826,373 was issued to Nakano on May 2, 1989 and still yet another was issued on Jan. 26, 1993 to Gneiding et al. as U.S. Pat. No. 5,181,977.

Another patent was issued to Conroy on Nov. 10, 1998 as U.S. Pat. No. 5,832,951. Yet another U.S. Pat. No. 5,928,468 was issued to Tolson on Jul. 27, 1999. Another was issued to Griffith et al. on Aug. 3, 1999 as U.S. Pat. No. 5,931,621 and still yet another was issued on Jul. 8, 2003 to Kubler et al. U.S. Pat. No. 6,588,999.

Another patent was issued to Kubler et al. on 6,604,899 as U.S. Pat. No. 6,604,899. Yet another UK Patent No. 555,374 was issued to Johnson on Aug. 19, 1943. Another was issued to Heldt on Feb. 26, 1975 as UK Patent No. 1,385,465 and still yet another was issued on Jun. 12, 1992 to Beley as FR. Patent No. FR2670183.

U.S. Pat. No. 4,165,904

Inventor: Merlya Reppert

Issued: Aug. 28, 1979

An adaptor bolt to permit fitting wheels having a given bolt hole circle diameter to wheel studs having a different circle diameter. The kit is made up of a plurality of adaptor bolts each comprising an internally threaded bore located eccentrically in the bolt with respect to its external threads. The internal threads fit on the studs and cap nuts fit on the external threads to mount the wheel on the adaptor bolts. Friction increasing means are provided on the internal threads to hold the adaptor bolts in various adjusted positions defining different diameter bolt circles.

U.S. Pat. No. 4,681,495

Inventor: Gerard Crespin et al.

Issued: Jul. 21, 1987

An adaptor bolt to permit fitting wheels having a given bolt hole circle diameter to wheel studs having a different circle diameter. The kit is made up of a plurality of adaptor bolts each comprising an internally threaded bore located eccentrically in the bolt with respect to its external threads. The internal threads fit on the studs and cap nuts fit on the external threads to mount the wheel on the adaptor bolts. Friction increasing means are provided on the internal threads to hold the adaptor bolts in various adjusted positions defining different diameter bolt circles.

U.S. Pat. No. 4,826,373

Inventor: Masahiro Nakano

Issued: May 2, 1989

A pin for injecting a grout material comprising an upper structure (I) into which an upper half portion (1') wherein a screw thread (2) and a lengthwise hole (3) are formed, a packing (4), a washer (5) and a knock pin (11) for knocking a grout pin (10) are inserted, and a lower structure (II) into which a lower half portion (1"), both tongued pieces (7', 7") of a slit wherein said slit (7) and a knurling portion (8) are formed and in the space formed by both tongued pieces (7', 7"), through the lengthwise hole (3) of said upper structure, the grout pin and the knock pin for knocking said grout pin are inserted.

U.S. Pat. No. 5,181,977

Inventor: Donald Gneiding et al.

Issued: Jan. 26, 1993

A tire fill valve having pressure relief and tire fill fluid gas flow limiting characteristics for use in filling tires to a predetermined pressure form a large flow capacity gas source delivering fill gas at a substantially greater pressure. Gases utilized typically are air or nitrogen. The valve of the invention is wheel mounted intermediate the gas pressurizing source and the tire gas valve inlet. Tire fill gas from a high pressure high capacity source passes through a flow limiting orifice having a positive closure or shutoff member and passes through a pressure sensitive chamber as it enters the tire.

U.S. Pat. No. 5,832,951

Inventor: Joseph Conroy Sr.

Issued: Nov. 10, 1998

A pneumatic control apparatus and method controls gas pressure inside a tire mounted on a wheel which rotates about the centerline of an axle. A bleeder valve is mounted on a body coaxially aligned with the axle centerline and is in fluid connection with a pneumatic fitting on the tire. The bleeder valve allows gas inside the tire to be relieved to the atmosphere when the gas is above a set pressure. The coaxial alignment of the bleeder valve with the axle centerline permits the bleeder valve to relieve gas pressure unaffected by centrifugal forces.

U.S. Pat. No. 5,928,468

Inventor: John Tolson

Issued: Jul. 27, 1999

An adaptor for injecting glue under high pressure into a joint to includes a shank portion with a self tapping external thread tapering from a connecting portion having an internal connecting thread for attachment to a zerk and radially outward wings, forming fingerpieces by which the shank portion can be rotated. An internal glue passageway extends completely through the adapter. A restorer's kit includes a supply of adapters, zerks, a high pressure lever action hydraulic gun for glue, a flexible high pressure connecting hose and zerk coupling, a veneer needle and a supply of dowel form wooden plugs.

U.S. Pat. No. 5,931,621

Inventor: Gary Griffith et al.

Issued: Aug. 3, 1999

The present locking mechanism for rotatable fastener functions to reliably and inexpensively secure a rotatable fastener in place once it is seated. This is accomplished by the formation of an aperture into the body of the rotatable fastener in a lengthwise direction coaxial with the axis of the cylindrical shaped rotatable fastener. A second aperture is formed in the body of the rotatable fastener perpendicular to the first aperture and intersecting same. A locking pin is placed in the second aperture such that one end of the locking pin is flush with the surface of the body of the rotatable fastener, non-interfering with the operation of the threads formed on the exterior surface of the body of the rotatable fastener. A second end of the locking pin protrudes into the first aperture. A locking post is placed in the first aperture, located above the locking pin and accessible via the open end of the first aperture in the head of the rotatable fastener. A craftsperson uses a tool to force the locking post down into the first aperture to thereby engage the protruding end of the locking pin, forcing the locking pin to move in the second aperture away from the first aperture. The locking pin is thereby driven into the wall of the cylindrical shaped aperture into which the rotatable fastener is threaded and prevents the further rotation of the rotatable fastener in either direction.

U.S. Pat. No. 6,588,999

Inventor: Frank Kubler

Issued: Jul. 8, 2003

A sealable fastener for insertion into a fastener opening bore in a receiving structure includes a fastener shank including a shank first end having a shank first end wall and a shank second end having a shank second end wall, a shank side wall extend between the shank first end wall and the shank second end wall and a circumferential channel recessed into the shank side wall; and a sealant delivery passageway having a passageway entry port in the shank first end and extending to a passageway exit port opening into the circumferential channel; so that a flowable sealant injected into the passageway entry port flows through the sealant delivery passageway and exits through the passageway exit port and flows into and around the circumferential channel, creating a circumferential seal between the fastener shank and the fastener opening in the receiving structure.

U.S. Pat. No. 6,604,899

Inventor: Frank Kubler et al.

Issued: Aug. 12, 2003

A sealable fastener for insertion into an fastener opening in a receiving structure includes a fastener shank including a shank first end having a shank first end wall and a shank second end having a shank second end wall, a shank side wall extending between the shank first end wall and the shank second end wall and a circumferential channel recessed into the shank side wall; and a sealant delivery passageway having a delivery passageway entry port in the shank second end and extending to a delivery passageway exit port opening into the circumferential channel; so that a flowable sealant placed in the fastener opening is drivable into the delivery passageway entry port as the fastener shank is inserted into the fastener opening, so that the sealant flows through the sealant delivery passageway and exits through the delivery passageway exit port and flows into and around the circumferential channel, creating a circumferential seal between the fastener shank and the fastener opening in the receiving structure.

UK Patent Number 555,374

Inventor: Leslie Johnson

Issued: Aug. 19, 1943

In a fastening device of the kind described in Specification 524,297 for securing together articles having registering apertures through which the device is passed, and comprising a tubular body 1 with a head 5 for abutment against one article, and balls 4 which can be projected radially to abut against the other article to retain the device in place, or allowed to collapse inwards to release the device under control of an axially movable member 6 within body 1, the body 1 has a bore of uniform diameter and the member 6 is positively moved between its two positions, in each of which it is retained by spring-loaded radial catches 12. As shown, the tubular bore 2 is closed at the left-hand end to exclude dust &c. the balls 4 are held captive in radial apertures 3 with reduced mouths, the rod 6 has a reduced end 7 which in the position shown allows the balls to move inwards, the rod 6 when moved to the left moving the balls outwards to project from the surface of body 1, and radial catches 12 surrounded by a spiral spring 15 engage in one or other of two grooves 9, 10 in the rod. The spring is covered by a sleeve forming the head 5. The rod is moved by a ring 8 which is slidably engaged in a slot in the end of body 1 so that rotating ring 8 rotates the whole device, if necessary to loosen it in the apertures. The invention is also applicable to the devices of similar type described in Specifications 554,307 and 555,041.

UK Patent Number 1,385,465

Inventor: Karl Heldt

Issued: Feb. 26, 1975

At least two components 1, 2 are releasably secured together by a bolt or stud 3 having a screw-threaded portion 5, 6 on at least one end to receive a nut 4 and having a blind bore 7 extending axially inwards from one end, a piston 8 extending in the bore 7 from its open end towards but stopping short of the blind end, the piston 8 being secured to the bolt 3 adjacent the open end of the bore, means being provided to admit pressure fluid to the blind end of the bore to pre-stress the bolt while the nut 4 is tightened, so that the joint remains stressed when the fluid pressure is released. As shown, a bore 10 through the piston 8 forms the admission means for pressure fluid. The stud or bolt 3 may be integral with one of the components 2. After completion of the joint, the piston 8 may be removed and the blind bore 7 plugged by a slightly tapered screw-threaded plug (not shown) which expands the upper part of the bolt radially to lock the nut 4.

FR. Patent Number FR2670183

Inventor: Louis Beley

Issued: Jun. 12, 1992

In one embodiment of this bung, which comprises a compressible sleeve (6) which swells in the orifice (1) to be obturated under the effect of the tightening of the screw (7), there is created a rotational immobilization of the bung in the orifice (1) before tightening, for example by having provided elliptical cross-sections of bung and orifice.

While these valve devices may be suitable for the purposes for which they were designed, they would not be as suitable for the purposes of the present invention, as hereinafter described.

SUMMARY OF THE PRESENT INVENTION

The present invention relates generally to release valves and, more specifically, to a method and apparatus for releasing pressure that may have built up behind a plug in a controlled manner. Environmental and safety regulations mandate that all bleeder valves in a gas and liquid hydrocarbon and chemical service require metal plugs to be installed downstream of the valve to ensure a positive shut off. Removal of these plugs can create a hazardous condition if there is not a good seat on the bleeder valve. Pressure can build up behind the plug and as the bull plug is removed, an uncontrolled pressure release can occur. The present invention is a safety device, serving as a plug and also providing a method for releasing the pressure that may have built up behind the plug in a controlled manner. The device comprises a carbon steel plug fabricated with a vent hole for controlled pressure release and a carbon steel modified hex bolt having a tapered seat.

A primary object of the present invention is to provide a safety device, serving as a plug.

Another object of the present invention is to provide a safety device, serving as a plug and also providing a method for releasing the pressure that may have built up behind the plug in a controlled manner.

Yet another object of the present invention is to provide a method for releasing the pressure that may have built up behind the plug in a controlled manner comprising a carbon steel plug fabricated with a vent hole for controlled pressure release an a carbon steel modified hex bolt having a tapered seat.

Additional objects of the present invention will appear as the description proceeds.

The present invention overcomes the shortcomings of the prior art by providing a method and apparatus for releasing pressure that may have built up behind a plug in a controlled manner. Environmental and safety regulations mandate that all bleeder valves in a gas and liquid hydrocarbon and chemical service require metal plugs to be installed downstream of the valve to ensure a positive shut off. Removal of these plugs can create a hazardous condition if there is not a good seat on the bleeder valve. Pressure can build up behind the plug and as the bull plug is removed, an uncontrolled pressure release can occur. The present invention is a safety device, serving as a plug and also providing a method for releasing the pressure that may have built up behind the plug in a controlled manner. The device comprising a carbon steel plug fabricated with a vent hole for controlled pressure release and a carbon steel modified hex bolt having a tapered seat.

The foregoing and other objects and advantages will appear from the description to follow. In the description reference is made to the accompanying drawing, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
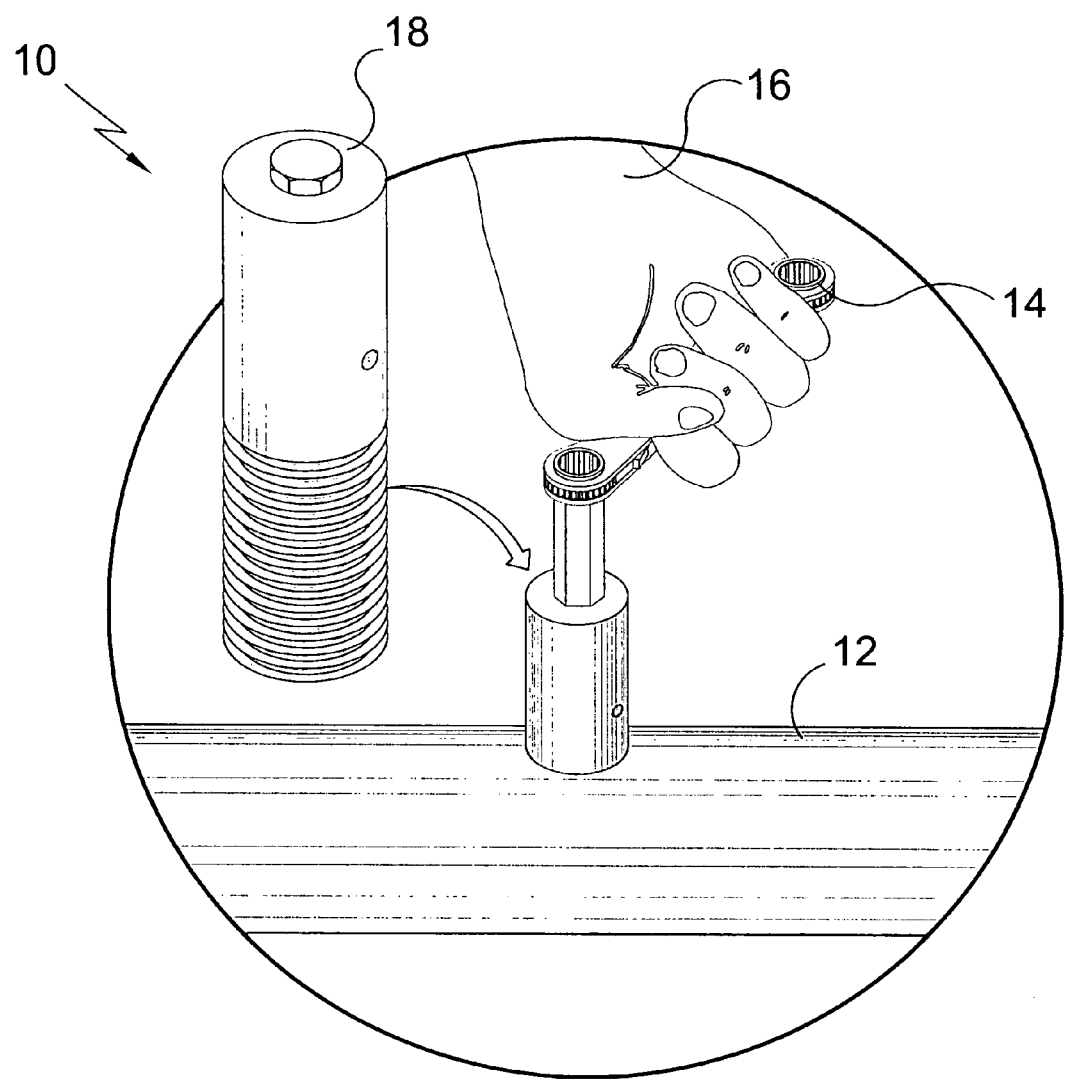
FIG. 1 is an illustrative view of the present invention in use.

With regard to reference numerals used, the following numbering is used throughout the drawings.

10 present invention
12 pipe
14 wrench
16 hand
18 plug
20 vent hole
22 bolt
24 threads
26 tapered seat
28 threads
30 "O"-ring
32 pressure relief point
34 back pressure

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10 in use. The present invention 10 discloses a method and apparatus for releasing pressure that may have built up behind a plug in a controlled manner. Environmental and safety regulations mandate that all bleeder valves (not shown) in a gas and liquid hydrocarbon and chemical service, as contained in pipe 12, require metal plugs to be installed downstream of the valve to ensure a positive shut off. Removal of these plugs can create a hazardous condition if there is not a good seat on the bleeder valve. Pressure can build up behind the plug and as the bull plug is removed, an uncontrolled pressure release can occur. The present invention 10 is a safety device serving as a plug 18 and also providing a method for releasing the pressure that may have built up behind the plug in a controlled manner. Also shown are pipe 12, wrench 14 and a hand 16 of a user turning the wrench and plug 18.

Figure 2:
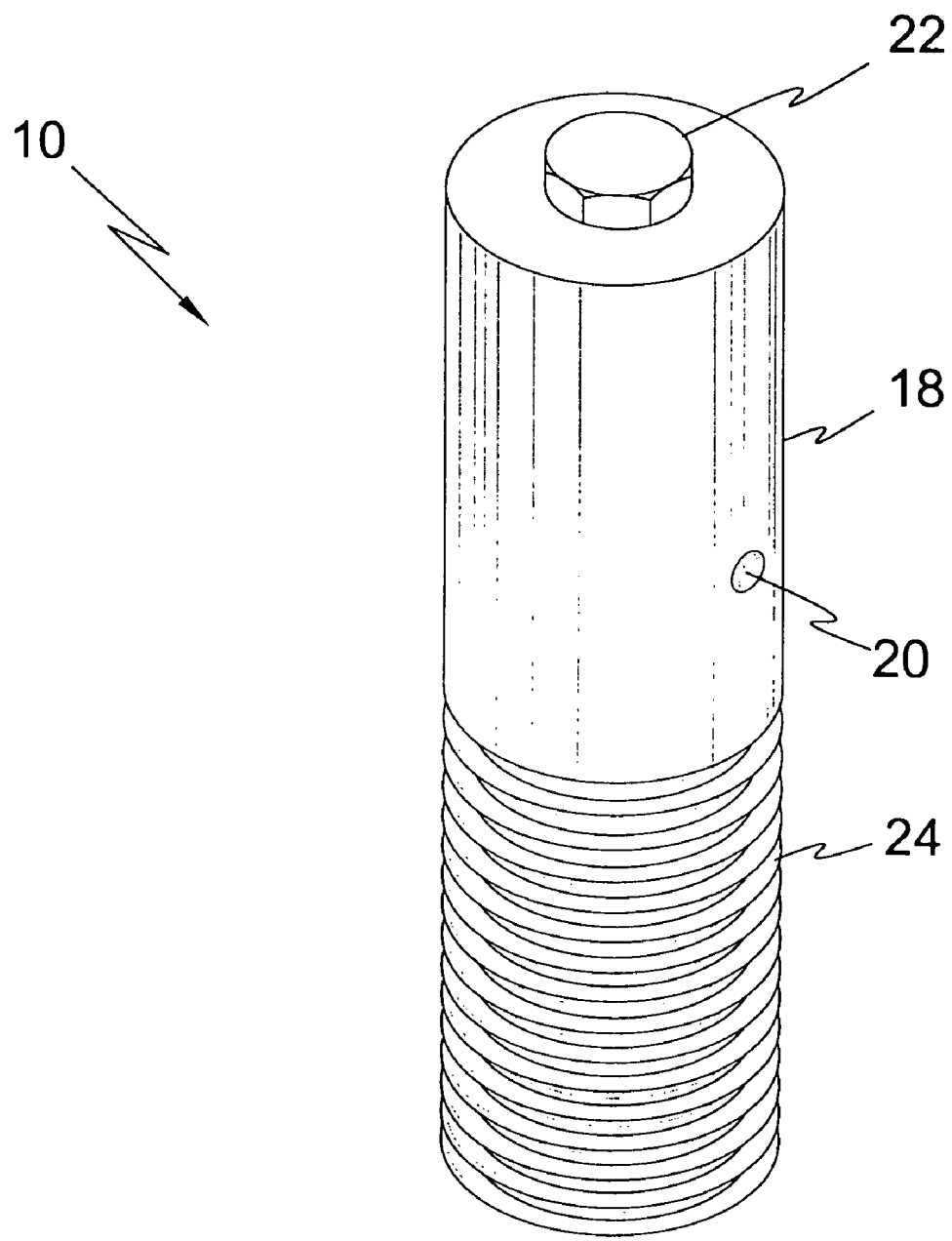
FIG. 2 is a perspective view of the present invention.

Turning to FIG. 2, shown therein is a perspective view of the present invention 10. Shown is the present invention 10 disclosing a method and apparatus for releasing pressure that may have built up behind a plug in a controlled manner comprising a solid carbon steel plug 18 fabricated with a vent hole 20 for controlled pressure release, and a carbon steel modified hex bolt 22 having a tapered seat. The hex bolt 22 and the threaded portion of plug 18 are the same length. Threads 24 are also shown on the outside surface of plug 18.

Figure 3:
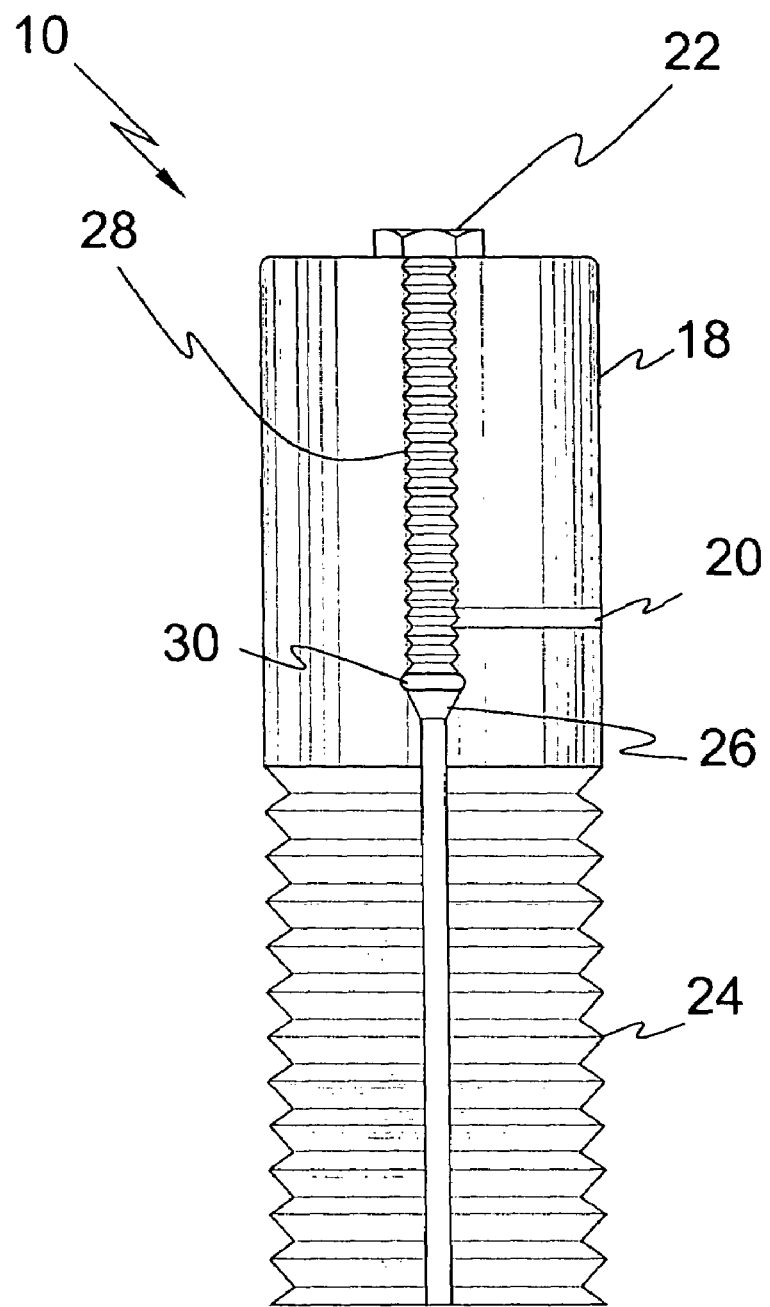
FIG. 3 is a sectional view of the present invention in a closed position.

Turning to FIG. 3, shown therein is a sectional view of the present invention 10 with bolt 22 in a closed position. Shown is the present invention 10 disclosing a method and apparatus for releasing pressure that may have built up behind a plug 18 in a controlled manner comprising a solid carbon steel plug 18 fabricated with a vent hole 20 for controlled pressure release, and a carbon steel modified hex bolt 22 having a tapered seat 26. The hex bolt 22 and the plug 18 threaded portion of are the same length. Also shown are TEFLON wrapped threads 28 and o-ring 30 on bolt 22 and threads 24. TEFLON is a trademark for a polytetrafluorethylene product (PTFE).

Figure 4:
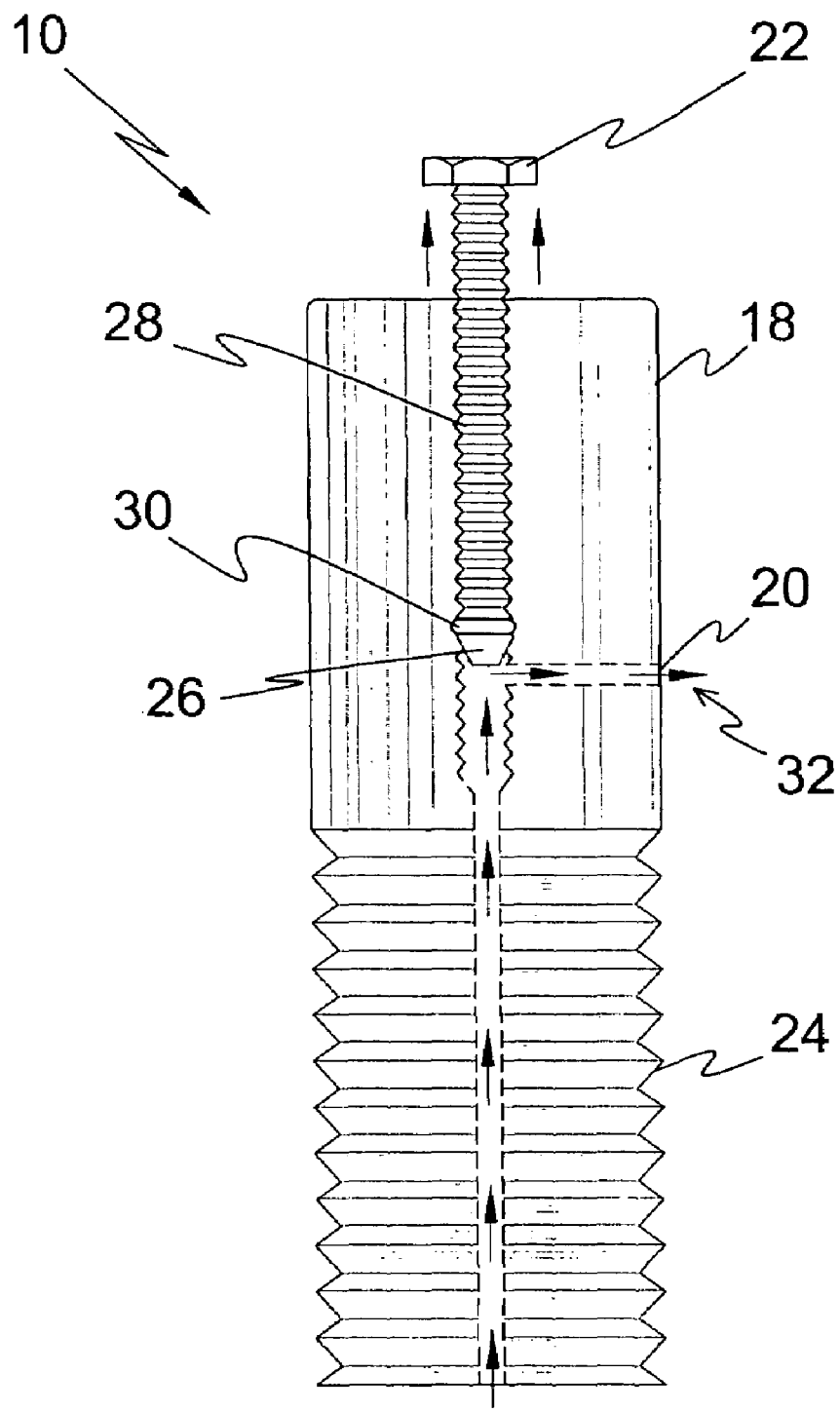
FIG. 4 is a sectional view of the present invention in an open position.

Turning to FIG. 4, shown therein is a sectional view of the present invention 10 with bolt 22 in an open position. The first step in releasing back pressure using the device of the present invention 10 is to position one's self so that you are to the side of the vent hole 20. Slowly turn the hex bolt 22 counterclockwise while monitoring the vent hole 20. As the metal to metal tapered seat 26 loses it's seal and passes by the vent hole 20, the pressure will be released at 32 through the vent hole in a controlled manner. Other previously disclosed elements are also shown.

Figure 5:
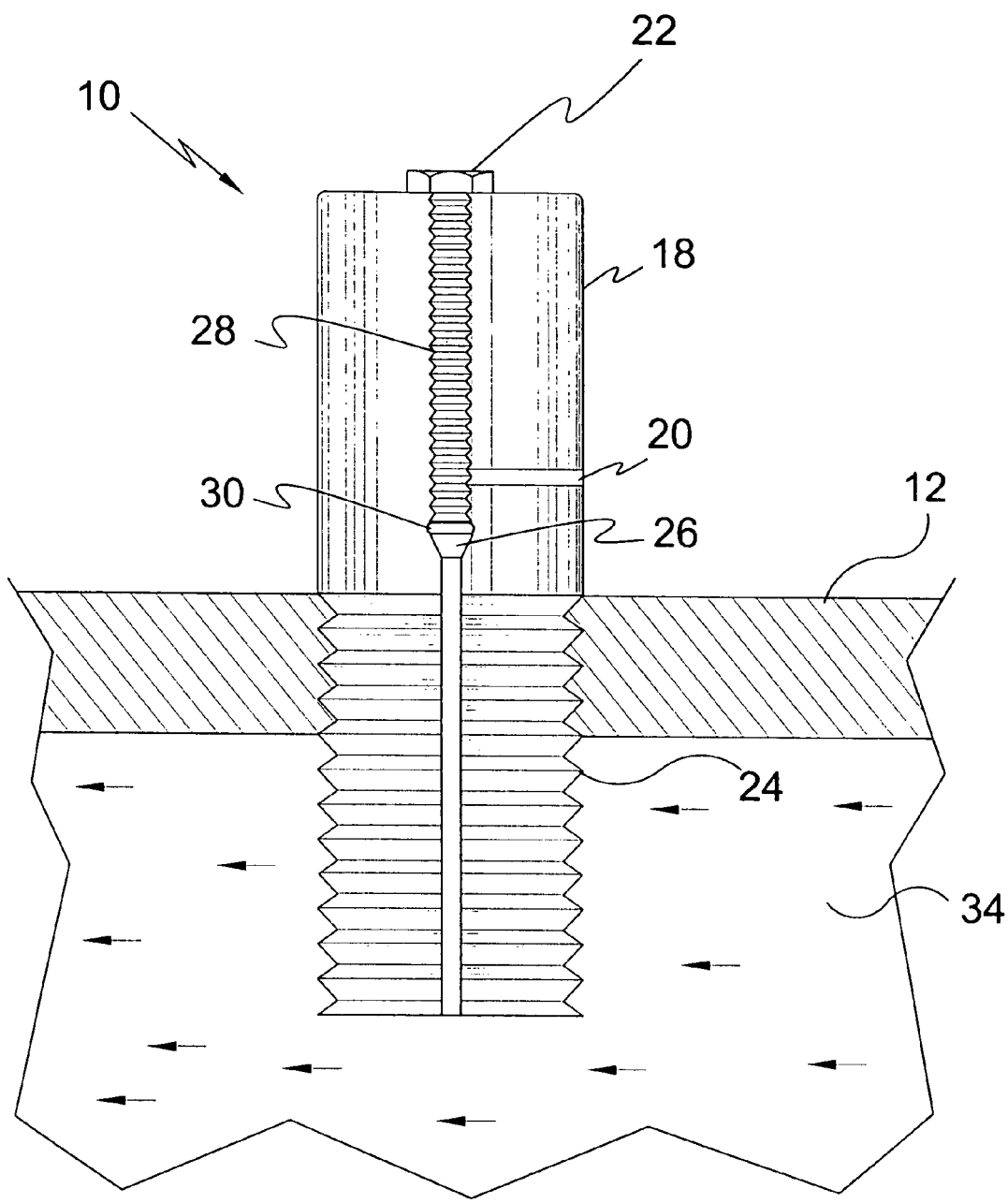
FIG. 5 is a sectional view of the present invention in use and in a closed position.

Turning to FIG. 5, shown therein is a sectional view of the present invention 10 in use and with bolt 22 in a closed position. Shown is the present invention 10 in use. The first step in releasing back pressure using the device of the present invention 10 is to position one's self so that you are to the side of the vent hole 20. Slowly turn the hex bolt 22 counterclockwise while monitoring the vent hole 20. As the metal to metal tapered seat 26 loses it's seal and passes by the vent hole 20, the pressure will be released through the vent hole in a controlled manner. Other previously disclosed elements are also shown along with the location and direction 34 of the back pressure.

Figure 6:
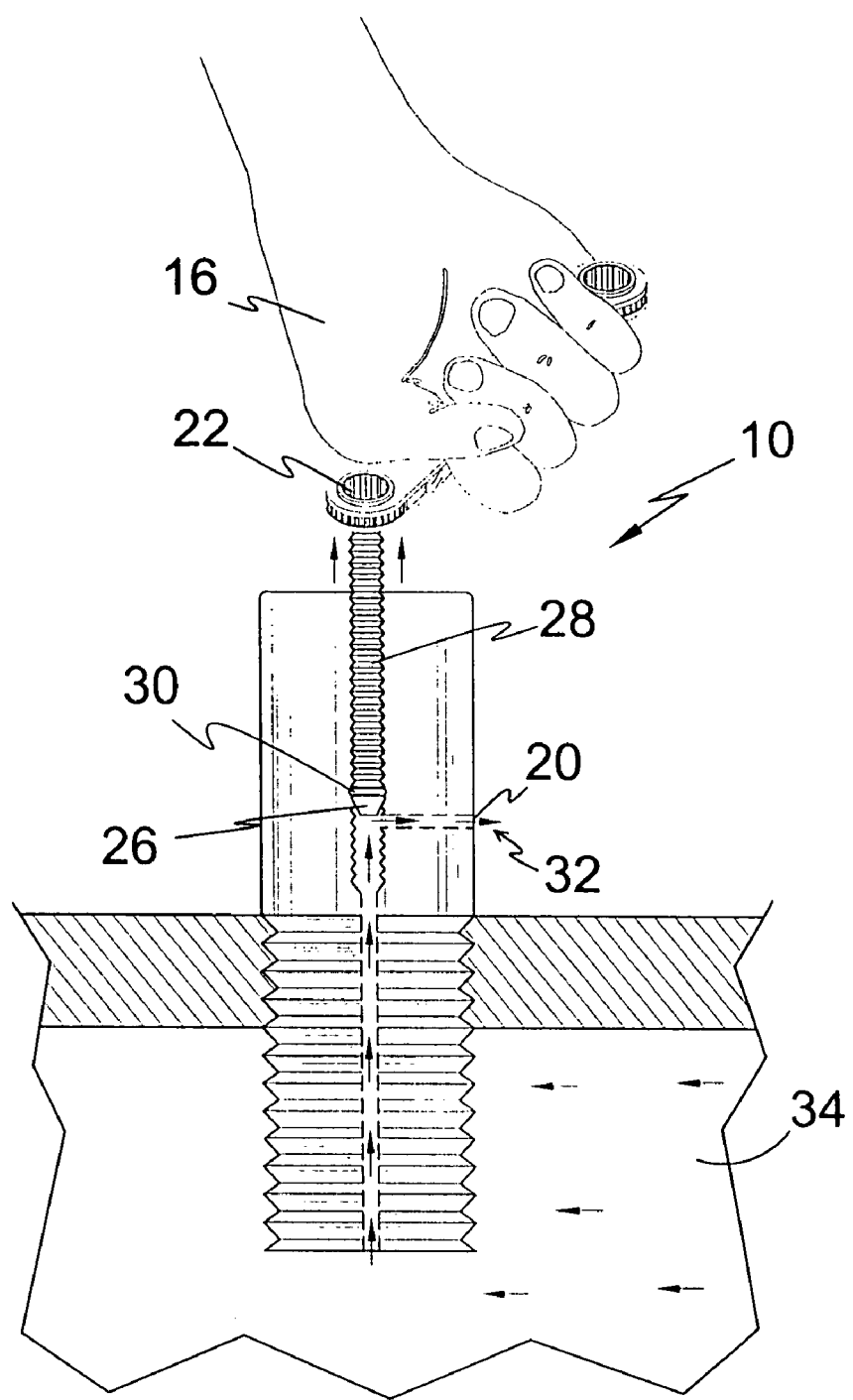
FIG. 6 is a sectional view of the present invention in use and in an open position.

Turning to FIG. 6, shown therein is a sectional view of the present invention 10 in use and with bolt 22 in an open position. Shown is the present invention 10 in use. The first step in releasing back pressure using the device of the present invention 10 is to position one's self or user 16 so that you are to the side of the vent hole 20. Slowly turn the hex bolt 22 counterclockwise while monitoring the vent hole 20. As the metal to metal tapered seat 26 loses it's seal and passes by the vent hole 20, the pressure will be released at 32 through the vent hole in a controlled manner. Other previously disclosed elements are also shown.

Figure 7:
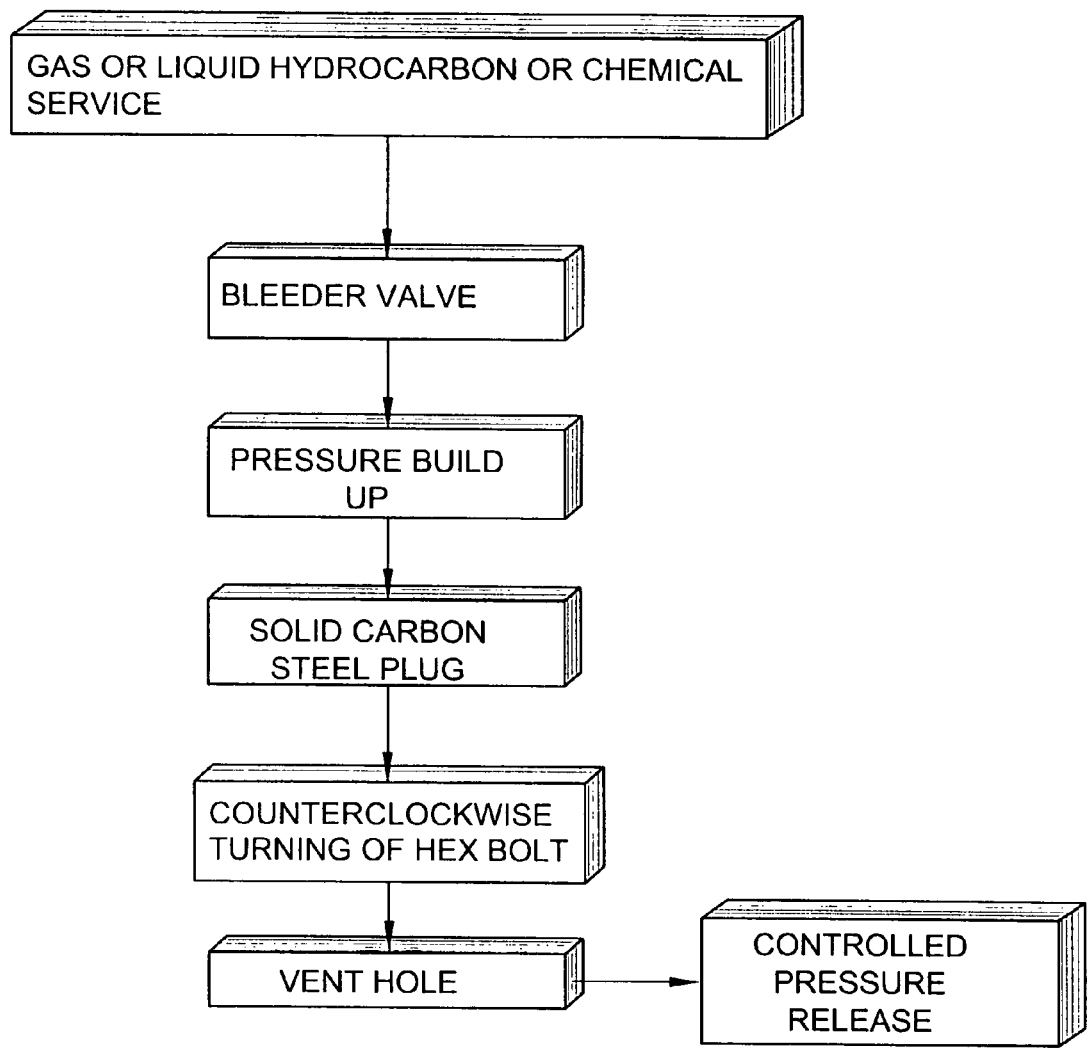
FIG. 7 is a flow chart of the function of the present invention.

Turning to FIG. 7, shown therein is a flow chart of the function of the present invention. The present invention discloses a method and apparatus for releasing pressure that may have built up behind a plug in a controlled manner. Environmental and safety regulations mandate that all bleeder valves in a gas and liquid hydrocarbon and chemical service require metal plugs to be installed downstream of the valve to ensure a positive shut off. Removal of these plugs can create a hazardous condition if there is not a good seat on the bleeder valve. Pressure can build up behind the plug and as the bull plug is removed, an uncontrolled pressure release can occur. The present invention is a safety device, serving as a plug and also providing a method for releasing the pressure that may have built up behind the plug in a controlled manner. The method of the present invention is summarized as follow: 1) provide gas or liquid hydrocarbon or chemical service, 2) provide bleeder valve, 3) have a pressure build up, 4) provide solid carbon steel plug, 5) loosen with counterclockwise turning of hex bolt, 6) provide vent hole, and 7) provide a controlled pressure release.

I claim:

1. An apparatus for releasing pressure from an internally pressurized fluid carrying pipe, the pipe having a wall having a threaded aperture therein, comprising:
   a) a cylindrical plug in said pipe wall carrying a hydrocarbon fluid under pressure for relieving excess pressure in said pipe, said plug having upper and lower ends and an outer surface, said plug having a centrally disposed bore therein, said bore extending along the central longitudinal axis from said upper end to said lower end of said plug, said central longitudinal axis being at a right angle to a central axis of said pipe carrying said hydrocarbon fluid, said plug extending into an interior of said pipe in line of flow of said hydrocarbon fluid;
   b) first threads being disposed on said outer surface in a lower portion of said plug extending from a midsection point of said plug to said lower end of said plug, for attaching said plug to the mating threaded aperture of the pipe wall, wherein said midsection point of said plug is aligned with an outer surface of said pipe;
   c) a vent hole extending out at a right angle from said centrally disposed bore to said outer surface of said plug, wherein said vent hole has a first end which fluidly connects with said bore and a second end terminating on said outer surface of said plug, said vent hole being disposed in the unthreaded outer portion of said plug;
   d) second threads being disposed in said bore extending from said upper end of said plug to a point below said first end of said vent hole and above the outer surface of said pipe wall, said second threads having upper and lower ends;
   e) a female seat being disposed in said bore at a bottom end of said second threads of said bore; and, f) a threaded bolt having first and second ends threaded into a threaded portion of said bore, a hex head being disposed on said first end, said bolt having a male tapered seat disposed on said second end thereof mating with said female seat when said bolt is fully threaded into said bore so as to form a seal, said threaded bolt having an o-ring mounted along an outer rim of said male tapered seat, said bolt having a length equal to a length of the threaded portion so that the hex head contacts the plug, whereby said male tapered seat is unmated with said female seat when said bolt is unscrewed from said bore releasing pressurized fluid from the pipe through said bore and said vent hole when said male tapered seat becomes disposed above said first end of said vent hole.

2. The apparatus of claim 1, further comprising PTFE wrapped on the threads of said threaded bolt.

3. The apparatus of claim 1, wherein said threaded bolt is made of carbon steel and said plug is made of carbon steel.

\* \* \* \* \*